United States Patent [19]

Eddleman

[11] 4,439,901

[45] Apr. 3, 1984

[54] CLAMP

[75] Inventor: Roy T. Eddleman, Los Angeles, Calif.

[73] Assignee: Spectrum Medical Industries, Inc., Los Angeles, Calif.

[21] Appl. No.: 479,335

[22] Filed: Mar. 28, 1983

[51] Int. Cl.³ .............................................. B65D 63/00
[52] U.S. Cl. ...................................... 24/530; 24/270; 24/273; 24/499
[58] Field of Search ..................... 24/248 B, 270, 273, 24/263 B, 326

[56] References Cited

U.S. PATENT DOCUMENTS

| 656,755 | 8/1900 | Stewart | 24/248 B |
| 3,861,701 | 1/1975 | Aring et al. | 24/326 |
| 4,244,083 | 1/1981 | Aremka et al. | 24/263 B |
| 4,252,220 | 2/1981 | London et al. | 24/248 B |
| 4,363,388 | 12/1982 | London et al. | 24/248 B |

Primary Examiner—Victor N. Sakran
Attorney, Agent, or Firm—Edgar W. Averill, Jr.

[57] ABSTRACT

A multi-part assembly held together by a clamp. Two or more parts are held together by a clamp which fits into two grooves formed in the outer surface of a part to be clamped. The clamp has a bail which surrounds the clamped parts, and a flexible arm holds one of the parts and the bail holds the other of the parts.

7 Claims, 9 Drawing Figures

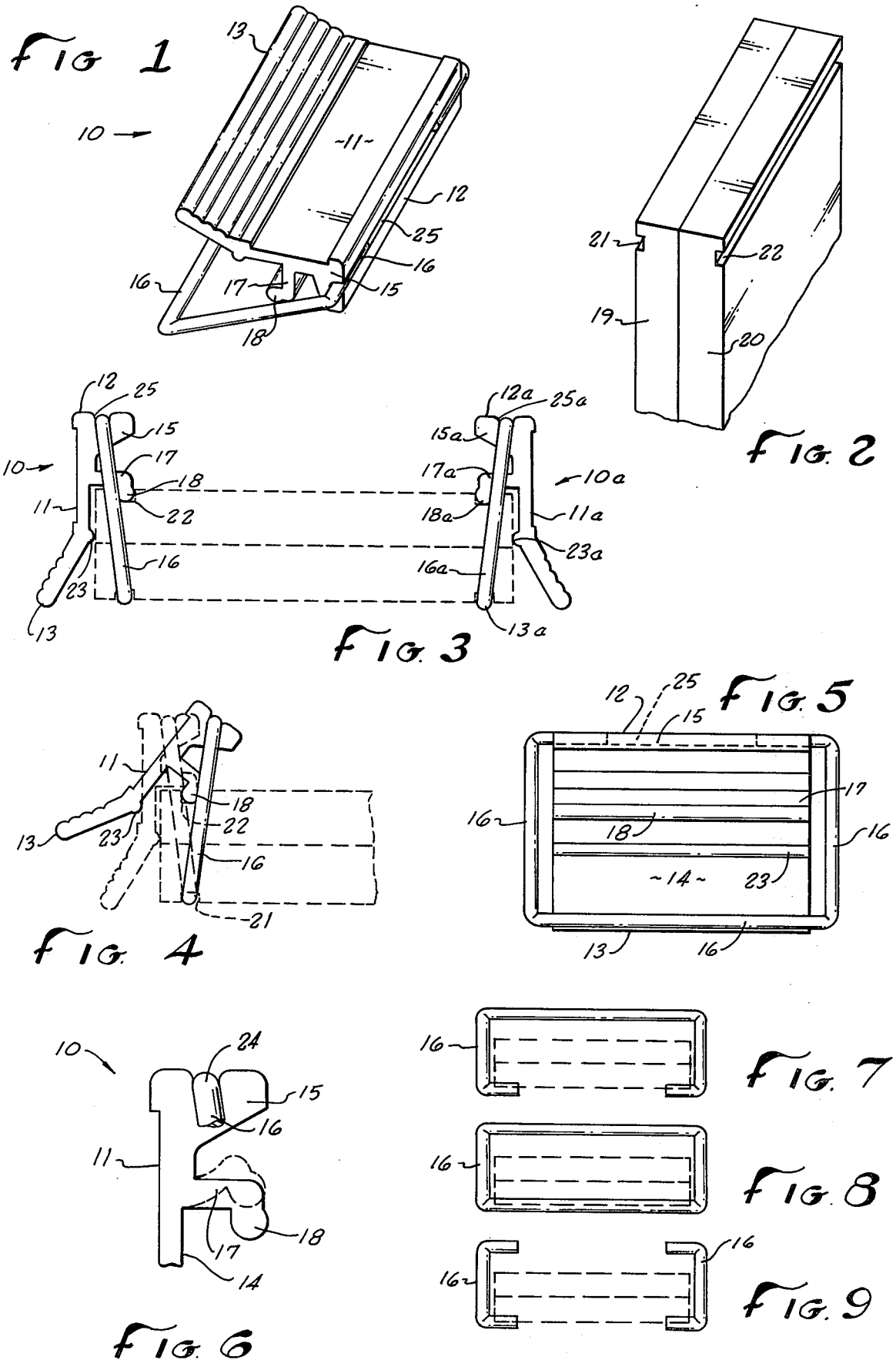

CLAMP

BACKGROUND OF THE DISCLOSURE

The field of the invention is clamps, and the invention relates more particularly to quick connect clamps which hold two or more members together and permit the easy disassembly of the parts.

In certain applications, it is necessary to provide a clamp which gives a firm clamping pressure even when the objects to be clamped are slightly compressed. One such application is in a chemical separation or purification process referred to as "dialysis" where a semipermeable membrane is clamped between two manifolds. The membrane itself may be slightly compressed by the pressure of the manifolds and it is important that the two manifolds be held tightly together even though the member between them is slightly compressed. In the past, a cumbersome method was used comprising four bolts with wing nuts and washers which could be tightened from time to time to maintain the desired pressure. It was, of course, time consuming to assemble and the amount of pressure exerted between the portions being held together was dependant upon the torque exerted on the thumb nuts.

SUMMARY OF THE INVENTION

It is an object of the present invention to provide a clamp and apparatus assembly which may be quickly attached and detached and which is capable of maintaining a constant firm pressure in spite of slight movement between the parts held together.

The present invention is for a multi-part assembly held together by at least one clamp. The assembly has a clampable member having at least two parts with an interlocking area formed in the outer surface of at least two of the parts. A clamp member cooperates with the interlocking areas to hold the two parts together. The clamp member has a base member with a bail support arm extending away from the base member. Bail means are held at the extremities of the bail by the bail support arm. The bail means has its base shaped to fit into the interlocking area formed in the outer surface of one of the parts and the bail member pivots with respect to the base member. A flexible arm is affixed to the base member and fits into the interlocking area on the clampable member. The two interlocking areas are positioned with respect to one another so that when the clamp is placed over the clampable member and moved from its open to its closed configuration, they are formed by the movement of the bail means passes over the point where the flexible arm is held to the clampable member. The protrusion is located at a sufficient distance along the flexible arm so that the protrusion is flexed in a direction toward the pivot point of the bail means when the clamp is affixed about the clampable member.

BRIEF DESCRIPTION OF THE DRAWINGS

FIG. 1 is a perspective view of the clamp member of the present invention.

FIG. 2 a perspective view, partially cut away, of a two-part clampable member.

FIG. 3 is a side view of a pair of clamps affixed about a clampable member shown in phantom view.

FIG. 4 is a side view of one end of the clamp and member of FIG. 3.

FIG. 5 is a front view of the clamp of FIG. 1.

FIG. 6 is an enlarged side view, partially cut away, showing the upper portion of the clamp of FIG. 5.

FIG. 7 is a front view of an alternate configuration of bail of the clamping device of FIG. 1.

FIG. 8 is a front view of an alternate configuration of bail of the clamping device of FIG. 1.

FIG. 9 is a front view of an alternate configuration of bail of the clamping device of FIG. 1.

DESCRIPTION OF THE PREFERRED EMBODIMENTS

The clamp used in the apparatus of the present invention is shown in perspective view in FIG. 1 and indicated generally by reference character 10. For ease of discussion, the orientation of the clamp in FIG. 5 will be used to name the different surfaces. The surface 11 shown in FIG. 1 will be referred to as the back of the clamp. Surface 12 will be called the top, and edge 13 lies along the bottom of the clamp. The front surface 14 is shown in FIG. 5.

A first overhanging arm 15 extends outwardly from back 11 and has a slot 25 which hold bail 16 in a manner which permits it to pivot about the openings. A flexible arm 17 also extends away from the base or back 11 of clamp 10. A protrusion 18 is formed in the end of arm 17.

A clampable member having two halves 19 and 20 is shown in FIG. 2. A groove 21 is formed in the outer surface of half 19 and a similar groove 22 is formed in the outer surface of half 20. The apparatus shown in FIG. 2 may be any two or more objects which are desired to be held together in a firm manner. One particular application for such a clamping action is in the medical laboratory procedure known as dialysis. In this procedure, member halves 19 and 20 would be a pair of manifolds or cells and several liquid inlets and outlets would be provided to direct the solutions into and out of mold halves 19 and 20. Since the semi-permeable membrane is typically held between halves such as 19 and 20, it is important that a firm pressure be maintained to prevent leakage of the liquid between the mold half and the member and the clamp of the present invention is capable of doing this as set forth below.

The clamp is inserted in a manner shown best in FIG. 4 of the drawings. The wire bail or other relatively inflexible arm 16 is first inserted in the lower groove 21. Secondly, protrusion 18 is inserted in groove 22 and the back 11 is pressed toward the clampable members 19 and 20 near the bottom 13. A stop 23 may also be formed in clamp 10 although this could also be formed on clampable member 19 or 20.

By the use of two clamps as shown in FIG. 3, the apparatus may be securely held and also suspended above a table top if inverted and placed on the tops 12 and 12a of clamps 10 and 10a. Clamp 10 has been given the same reference characters as clamp 10 with the addition of the letter "a".

The firm holding ability of the clamp assembly of the present invention is brought about by a flexing of arm 17 as depicted in phantom lines in FIG. 6. As the clamp is inserted as indicated in FIG. 4, arm 17 flexes upwardly and maintains a firm pressure on the bail and protrusion 18 even though the distance between these two points varies slightly since the flexing of arm 17 permits slight movement. Because of the location of the pivot point 24 of bail 16 at a position closer to back 11 than that of protrusion 18, clamp 10 is held firmly against the clampable member made up of halves 19 and 20. The application of the clamp of the present invention may be accomplished with a quick firm snapping action which is both quick and secure. A clamp may be readily removed by lifting as shown in FIG. 4 and rapidly removed from the assembly to be clamped. When the clamp is inserted as shown in FIG. 4, note that the bail 16 moves through an arc about groove 21 and during this movement, the arc passes over protrusion 18 which is where the flexible arm touches the clampable member.

It can be readily seen that more than two objects may be held in a stack as long as a groove or other clamp mating area is provided in both outer surfaces of the entire assembly to be clamped. It would, of course, be possible to change the relative locations of the groove and protrusion so that a protrusion on clampable halves 19 and 20 could mate with a groove on arm 17 and in bail 16. Thus, the grooves and protrusions are merely interlocking areas which may be either grooves, pins, adhesives or any pair of mating surfaces which prevents a slipping or sliding between the two areas.

The body of the clamp of the present invention may be made from a metal such as aluminum or a polymer such as polypropylene or polyvinyl chloride. A particularly efficient means for fabricating the clamp of the present invention is by extrusion.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

What is claimed is:

1. A multi-part assembly held by at least one clamp, said assembly comprising:
   a clampable member having at least two parts;
   a first interlocking area formed in the outer surface of one of said parts;
   a second interlocking area formed in the outer surface of a second of said parts;
   a clamp member comprising:
   a base member;
   a bail support arm extending inwardly with respect to said base member;
   bail means having a pivot end and a clamp end, said bail means being held at the pivot end thereof by said bail support arm at a bail pivot point, said bail means having its clamp end shaped to be held by said second interlocking area formed in the outer surface of one of said parts, and said bail means being further adapted to pivot with respect to the base member; and
   a flexible arm affixed to the base member, said arm having a contact area being shaped to mate with the first interlocking area in the outer surface of one of said parts and said contact area being located at a point within an arc formed by the movement of the bail means from its unclamped to its clamped configuration and being further located at a point so that it is flexed in a direction toward said bail pivot point when said clamp is affixed about the clampable member.

2. The clamp assembly of claim 1 wherein said first interlocking area comprises a groove formed in the outer surface of one of said parts.

3. The clamp assembly of claim 1 wherein said second interlocking area comprises a groove formed in the outer surface of one of the second of said parts.

4. The assembly of claim 3 wherein said contact area comprises a protrusion shaped to mate with the groove formed in the outer surface of the first of the parts.

5. The assembly of claim 1 wherein said first interlocking area comprises a groove formed in the outer surface of one of said parts, said second interlocking area also comprises a groove formed in the outer surface of a second of said parts, and said contact area comprises a protrusion shaped to mate with the groove formed in the outer surface of the first of the parts.

6. The assembly of claim 1 wherein there are two parts of said clampable member and two clamp members affixed thereto.

7. The assembly of claim 1 wherein said bail means is a C-shaped wire.

* * * * *